United States Patent Office 2,915,478
Patented Dec. 1, 1959

2,915,478

PREPARATION OF A COBALT OXIDE-MOLYBDENUM OXIDE-ALUMINA CATALYST

Henry Erickson, Park Forest, Ill., assignor to Sinclair Refining Company, New York, N.Y., a corporation of Maine No Drawing. Application December 5, 1955
Serial No. 550,849

2 Claims. (Cl. 252—465)

This invention relates to the preparation of a cobalt oxide-molybdenum oxide-alumina catalyst using cobaltous sulfate as the source of cobalt.

Economically, it is desirable to employ less expensive sources of metal components when manufacturing catalysts for utilization in commercial operations employing large amounts of catalyst such as petroleum processes, for instance hydrodesulfurization. In one method of preparing cobalt oxide-molybdena-alumina catalysts the cobalt and molybdenum components are absorbed on the alumina base by mixing with cobalt nitrate and ammonium molybdate. This source of cobalt is expensive and it would be particularly advantageous if a less expensive source such as cobaltous sulfate could be employed. However, this comparatively inexpensive salt cannot be incorporated on the alumina base by absorption since the sulfate could poison the catalyst and is not removed by decomposition during calcination. Also, water washing cannot be employed to remove the sulfate ions as this would take cobalt and molybdenum from the alumina support.

In the present invention I have devised a method for using cobaltous sulfate as a source of cobalt when manufacturing cobalt oxide-molybdena-alumina catalysts, which method avoids the above-noted difficulties associated with the use of the cobalt sulfate salt. In my method alumina, sodium carbonate and cobalt sulfate are added to an aqueous medium to form a suspension. The suspension is then heated until the substantial evolution of carbon dioxide ceases. Solids are separated from the suspension and then washed and dried. The dried solids are impregnated with ammonium molybdate and then calcined in providing the finished catalyst.

In my process the aqueous suspension can be formed merely by mixing alumina, sodium carbonate and cobalt sulfate and then heating the suspension to reaction temperature. The separate ingredients can be added to the aqueous medium in any order desired and heating begun at any time during the addition. Most advantageously, however, divided or small particle form alumina is suspended in an aqueous solution containing either sodium carbonate or cobalt sulfate. The resulting mixture is heated while agitating to maintain suspension of the alumina. After the temperature of the suspension is above about 150° F. and preferably from about 200° F. to the boiling point, the cobalt sulfate or sodium carbonate remaining to be added, as the case may be, is combined. Regardless of the method of including the alumina, sodium carbonate and cobalt sulfate, sufficient sodium carbonate is ordinarily added in the suspension to react with all of the cobalt salt, and preferably, excess carbonate is employed to assure reaction of the cobalt sulfate. Heating of the suspension is continued until no substantial evolution of carbon dioxide is detected. The temperature of carbon dioxide evolution is generally greater than about 150° F. and preferably from about 200° F. to the boiling point. The reaction mixture is then treated to remove solids as by filtering, centrifuging or other means. Since ions which can poison the catalyst are present in the suspension the solids are washed. Generally, the washing is accomplished with water and is continued until sodium and sulfate ions are sufficiently removed to meet catalyst specifications.

The washed solids can then be dried and impregnated by contact with an aqueous solution of ammonium molybdate which avoids the introduction of ions which will not be removed during subsequent calcination. The impregnated solids are processed to an activated catalyst by calcination which is generally conducted at a temperature from about 800 to 1200° F. If desired, the solids can be dried in a separate operation to remove free water prior to calcination. Also, before drying, the solids can be formed into macrosized particles by tabletting or extrusion, the latter being preferred. The macrosized particles generally have diameters from about $\frac{1}{16}''$ to $\frac{1}{4}''$ and their lengths will vary from about $\frac{1}{16}''$ to $1''$ or more.

Generally, the catalysts prepared by my process will contain about 1 to 20 weight percent of the cobalt component calculated as cobaltous oxide and about 2 to 25 weight percent of the molybdenum component calculated as molybdenum trioxide. The major component of the catalyst is alumina and as previously indicated it serves as the base upon which the cobalt and molybdenum components are deposited. The alumina employed in the present method can be gelatinous or particulate and suitable forms include the alumina hydrates such as monohydrate and trihydrate. Preferably, the hydrate contains about 10 to 75 weight percent of trihydrate with substantially the remainder being amorphous or a form detected as monohydrate, for instance boehmite, by X-ray diffraction techniques using samples dried at 120° C., or mixtures of these forms. Usually the trihydrate content of the alumina will be less than about 50 weight percent. Also the hydrate can be partially or completely dried or partially or completely calcined. The size of the alumina can vary when particulate; however, finely divided alumina or spray-dried microspheres are preferred as they present large surface areas. The alumina base can contain minor amounts usually up to about 25% by weight of promoting or stabilizing constituents, such as for instance, silica, titania, zirconia, thoria, boria, fluoride, etc. The alumina can be prepared by any convenient means, for instance by neutralization of an acid salt of aluminum such as the sulfate or chloride or of sodium aluminate. Alternatively, the acid salt may be employed to neutralize the sodium aluminate. The precipitated alumina hydrate can then be washed to reduce the soluble salt content to a level which will permit conversion of a portion of the amorphous and monohydrate phases to the trihydrate phases if desired. The alumina is then dried as by spray drying and washed until substantially free of soluble impurities such as sodium and sulfate. The washed alumina may be redried at a relatively low temperature, say about 110 to 120° C., until the free water has been substantially removed. Other methods of alumina preparation can be employed.

In preparing a catalyst according to my invention 99 lbs. of sodium carbonate are dissolved in an amount of water sufficient to form a thin slurry (8% solids) when the alumina hydrate is added. 2342 lbs. of alumina hydrate (30% volatile matter) containing about 15 weight percent of trihydrate with the remainder being essentially amorphous or monohydrate alumina as determined by X-ray diffraction analysis are added to the sodium carbonate solution to form a slurry. The slurry is then heated to boiling while being vigorously stirred.

An aqueous solution containing 153 lbs. of cobaltous sulfate hydrate (32.7% cobalt) is slowly added to the boiling slurry. Heating and stirring are continued for one-half hour after carbon dioxide evolution ceases. The slurry is filtered and the filter cake washed to remove sodium and sulfate ions. The cake is then dried at 245° F. After determination of the ignition loss and water absorption capacity, the dried cake is impregnated with an aqueous solution containing 220 lbs. of ammonium molybdate $((NH_4)_6Mo_7O_{24} \cdot 4H_2O)$. The impregnated alumina is then dried at a temperature of about 245° F., and sufficient water is added to provide the necessary plasticity for extrusion. The solids are extruded and cut to ⅛" x ⅛" particles and dried at about 250° F. Dried extruded particles are then calcined or activated at a temperature of 900° F. for about 6 hours while in contact with flowing air.

The cobalt oxide-molybdena-alumina catalysts of this invention are particularly useful in hydrodesulfurization of petroleum hydrocarbons. In such processes the temperatures are usually from about 500 to 1000° F. while pressures range from about 1 to 100 atmospheres with about 1 to 10 atmospheres being preferred to maintain the hydrocarbons in the vapor phase. The hydrocarbons are charged to the catalyst at a rate to provide adequate contact to effect the desired degree of desulfurization and generally at rates ranging from about 0.1 to 20 liquid volumes of hydrocarbon per volume of catalyst per hour. The amount of free hydrogen present in the reactor will depend upon the rate of desulfurization to be effected, the composition of the charge, the amount of free hydrogen in the charge, etc., and the amount will usually vary from about 50 to 10,000 cubic feet of hydrogen per barrel of hydrocarbon. The hydrodesulfurization can be conducted in a catalyst bed which is fixed, fluidized or in any other suitable form.

I claim:

1. A method for preparing a cobalt oxide-molybdenum oxide-alumina catalyst containing from about 1 to 20 weight percent of cobalt calculated as cobaltous oxide and about 2 to 25 weight percent of molybdenum calculated as molybdenum trioxide, which comprises adding alumina, cobaltous sulfate and at least sufficient sodium carbonate to react with all of the cobalt sulfate, to water to form a suspension, heating the resulting suspension to a temperature of at least 150° F. until substantial evolution of a carbon dioxide ceases, separating the solids from the suspension, washing with water until sulfate ions are removed, drying the solids, impregnating the solids with an aqueous solution of ammonium molybdate and calcining the impregnated solids.

2. The method of claim 1 in which a solution of cobaltous sulfate in water is added to a suspension comprised of the alumina in a solution of sodium carbonate in water which has been heated to the temperature of at least about 150° F.

References Cited in the file of this patent

UNITED STATES PATENTS

| | | |
|---|---|---|
| 2,295,653 | Griffith et al. | Sept. 15, 1942 |
| 2,486,361 | Nahin et al. | Oct. 25, 1949 |
| 2,487,466 | Nahin | Nov. 8, 1949 |
| 2,499,255 | Parker | Feb. 28, 1950 |
| 2,638,454 | Rowan | May 12, 1953 |
| 2,732,329 | Doumani | Jan. 24, 1956 |
| 2,748,062 | Doumani | May 29, 1956 |